3,331,807
POLYOLEFIN DYEING WITH BENZOTHIAZOLE-
AZO 1,3-DIKETONES
Paul L. Stright, Hamburg, N.Y., assignor to Allied Chemical Corporation, New York, N.Y., a corporation of New York
No Drawing. Original application Feb. 28, 1963, Ser. No. 261,859. Divided and this application Feb. 23, 1966, Ser. No. 549,074
6 Claims. (Cl. 260—41)

This application is a division of application for U.S. Letters Patent Ser. No. 261,859, filed Feb. 28, 1963.

This invention relates to novel metallizable monoazo dyestuffs. More particularly it relates to novel benzothiazolylazo dyestuffs which are specially suited for dyeing polymers of α-olefins and to processes for the preparation thereof.

The novel metallizable monoazo dyestuffs of my invention comprise 2(2-benzothiazolylazo)-1,3-diketones which are free of water solubilizing substituents and wherein the oxo groups of the 1,3-diketones are positioned in an open-chain structure. These novel dyestuffs may be represented by the following formula:

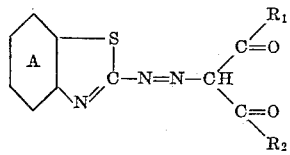

wherein $R_1$ and $R_2$ represent the same or different organic radicals of the aromatic, arylaliphatic or aliphatic series which are attached to the oxo groups by means of a carbon to carbon bond; A represents an ortho phenylene nucleus, and wherein A, $R_1$ and $R_2$ may contain substituents other than those inducing solubility to water, e.g. sulfonic acid, such as a lower alkyl, aryl, aralkyl, halogen, nitro, hydroxy, substituted amino, alkoxy, aryloxy, alkyl sulfone, aryl sulfone, carboxy amido or N-substituted sulfonamido group.

As mentioned above, the novel dyestuffs of this invention are of especial utility for the dyeing and printing of polymers of α-olefins. Such polymers have been produced in steadily increasing quantities and grades in recent years. By virtue of their many valuable characteristics including mechanical strength, high elasticity, resistance to solvents and other elements, the polymers have found their way into a multitude of useful applications in the form of films, filaments, yarns, fabrics, ropes, molded products, and the like. However, because of their extreme chemical inertness and hydrophobic character, these polymers have shown little affinity for the dyestuffs and pigments generally available for the coloration of natural and synthetic materials. Attempts to effect the coloration of α-olefin polymers by compounding pigments into the resin, as in Banbury mixers, compound extruders, or the like, were not entirely satisfactory due to the difficulty in obtaining satisfactory, or even adequate, dispersion of the pigment in the resin. Although it has been found that disperse dyestuffs produce light to medium shades in poly-α-olefins, the fastness to light and washing of such colorations leaves much to be desired. Other techniques for improving the dyeability of poly-α-olefins, as by grafting or otherwise introducing polymeric chains containing functional groups to the polyolefin or by applying oil soluble dyes emulsified in water and oil to the polymer have not been entirely successful due to cost or other considerations.

Polymers of α-olefins, especially polypropylene, are known to be subject to degradation upon exposure to heat, such as is encountered during mechanical processing as for example during molding, extrusion, and the like, and to sunlight as encountered by the finished articles, such as rugs, draperies and automobile seat covers. This sensitivity to heat and to sunlight can be overcome, at least to a significant degree, by incorporating in the polymer various stabilizers, many of which are compounds, inorganic and organic, of metals such as chromium, nickel, zinc, cobalt, copper, cadmium and the like. These metals belong to the transition group of elements and characteristically are capable of forming Werner type complex compounds. Nickel compounds, such as the bis-(p-alkylphenol) monosulfide nickel compounds disclosed in U.S. Patent 3,006,885 as stabilizers for polypropylene, are especially effective in this connection. Inorganic compounds, as disclosed in French Patents 1,142,024 and 1,142,025, are likewise effective as stabilizers for these valuable polymers. The use of compounds of various other of the above metals as additives to polypropylene is disclosed in U.S. Patents 2,971,940, 2,980,645 and 2,997,456.

These stabilizing compounds are normally used in relatively small amounts, i.e., from about 0.001% to about 3% by weight, and are generally incorporated in the polymer during the processing stage. Such small amounts normally suffice to provide adequate stabilization of the polymer against degradation by heat and light and polymers of poly-α-olefins containing the same will be hereinafter referred to as "stabilized."

It has now been discovered that the novel monoazo compounds of my invention are excellent dyestuffs for solid polymers of α-olefins having from 2 to 4 carbon atoms per unit and containing Werner complex forming metals. The new dyestuffs are applied to the olefin polymers as aqueous dispersions and yield colorations which are characterized by fastness to light and to washing as well as by the strength, i.e., depth of coloration, of the resulting dyeing.

The novel dyestuffs of my invention, while generally applicable for the coloration of polymers of α-olefins having from 2 to 4 carbon atoms per unit and containing a Werner complex forming metal, are particularly valuable as colorants for crystalline, izotactic polypropylenes having an intrinsic viscosity above 1.0 (measured in tetralin at 135° C.) which are capable of use in the production of fibers, films, molded articles and the like. Such polypropylenes are well known in the art and are commercially available. They may be produced by polymerization of propylene in the presence of Ziegler type catalysts and inert liquids. Such polypropylenes often contain Werner complex forming metals added as stabilizers during the processing thereof or as incidental residues resulting from various treatments of the polymer during its preparation.

The novel metallizable monoazo compounds of my invention can be prepared by several well known general methods for the preparation of monoazo derivatives. For example, a 2-aminobenzothiazolyl compound is diazotized and coupled with a solution or suspension of an open-chain 1,3-diketone, e.g., 2,4-pentanedione, 1,3-diphenyl-1,3-propanedione, and the like. The resulting coupling product is generally insoluble in aqueous media and may be separated, dried, etc., in the conventional manner.

Examples of the 2-aminobenzothiazolyl compounds suitable for use in preparing the novel metallizable monoazo dyestuffs of this invention include the following:

2-aminobenzothiazole
2-amino-6-bromobenzothiazole
2-amino-5,6-dichlorobenzothiazole
2-amino-6-nitrobenzothiazole
2-amino-6-methylbenzothiazole
2-amino-6-hexylbenzothiazole
2-amino-6-methoxybenzothiazole
2-amino-6-ethoxybenzothiazole
2-amino-4,6-diethylbenzothiazole
2-amino-4,6-dimethoxybenzothiazole 2-amino-4,7-diethoxybenzothiazole
2-amino-6-trifluoromethylbenzothiazole
2-amino-6-thioethylbenzothiazole
2-amino-6-isopropylbenzothiazole
2-amino-6-n-butyrylamidobenzothiazole
2-amino-6-β-hydroxyethylbenzothiazole
2-amino-6-γ-hydroxypropylaminobenzothiazole
2-amino-6-N,N-dimethylsulfamylbenzothiazole
2-amino-6-N-propylsulfamylbenzothiazole
2-amino-6-n-butylsulfonylbenzothiazole
2-amino-6-phenylsulfonylbenzothiazole
2-amino-6-(4-chlorophenylsulfonyl)benzothiazole Examples of suitable open-chain 1,3-diketone coupling components suitable for use in the preparation of the novel dyestuffs of this invention include the following:

2,4-pentanedione
1-phenyl-2,4-pentanedione
1-(4-chlorophenyl)-2,4-pentanedione
1,3-diphenyl-1,3-propanedione
1,3-bis(2-chloro-4-methylphenyl)1,3-propanedione
1,1,1-trifluoro-2,4-pentanedione
1-(2-furyl)-1,3-butanedione The novel metallizable monoazo dyestuffs of my invention are practically insoluble in water at ordinary temperatures. As such they are applied to the poly-α-olefin materials in the manner of disperse dyestuffs, i.e., as aqueous dispersions, which can be obtained by various means. For example the monoazo compound is ground in the presence of a dispersing agent by means of a micropulverizer, sand, inorganic salt, and the like. The more finely divided the dyestuff composition is, the more effective as a dye the composition will be, as is generally known. The dispersed dye is admixed with a sufficient quantity of water to obtain a thoroughly wetted paste or slurry, which is then diluted with a further quantity of water to obtain the desired concentration of dyestuff in the ultimate dyebath. For dyeing the poly-α-olefin material is entered into the dyebath, which may or may not contain the usual dyeing adjuvants and the dyeing effected by heating the bath to a suitable dyeing temperature and by working the material in the heated bath for a sufficient period, usually about one hour, to obtain the desired depth of shade. During the latter period, the adjustment of the bath to a pH of below 5 will usually result in a better exhaustion of the dyestuff from the dyebath. The dyed material may then be rinsed with water, washed with warm (60° C.) mild soap solution, rinsed again with water and dried.

The amount of dyestuff employed relative to the amount of poly-α-olefin material to be dyed can be varied over a wide range. The amount used will depend to a major extent upon the depth of shade desired and to a lesser but still important extent upon the metal content of the polymer. It is significant also to point out that the various Werner complex forming metals will vary somewhat in the ease with which they form the complex compounds with monoazo dyestuffs. In most instances, deep shades can be obtained from 0.5% dyeings which shades are increased little in intensity by increasing the dye concentration to 2.0% or more. Light shades can be obtained by the use of as little as 0.5% or less of these dyestuffs.

The excellent results obtained on dyeing of poly-α-olefin materials containing a Werner complex forming metal with the novel metallizable monoazo compounds of this invention are indeed highly surprising since comparable compounds produce colorations on poly-α-olefins which are either of poor strength or of poor fastness properties. Thus the dyestuff 3-(2-thiazolylazo)-pentane-2,4-dione produces shades of poor light fastness on polypropylene and 3-(1,3,4-triazinyl-2-azo)-pentane-2,4-dione produces colorations having poor tinctorial strength. The dyestuff derived from diazotized 2-amino-6-ethoxybenzothiazole coupled into acetoacet-o-anisidide gives only weak colorations when applied to polypropylene. It can thus be seen that the dyeing characteristics of the novel compounds of my invention are surprising and are highly useful.

The following examples will illustrate the present invention. Parts and percentages are by weight and temperatures are given in degrees centigrade unless otherwise specified.

Example 1

To a hot (70° C.) solution of 16.1 parts of 100% sulfuric acid in 38 parts of water, 19.4 parts of 2-amino-6-ethoxybenzothiazole were added. This mixture was poured into 515 parts of 50° Bé. sulfuric acid and the mixture cooled to and maintained at 5° C. or below during the addition thereto of 150 parts of a 1.0 molal solution of nitrosylsulfuric acid in about 50 minutes. The resulting mass was agitated for about 1 hour and then the excess nitrite was destroyed with sulfamic acid. The thus prepared diazonium salt solution was divided in half.

One half of the diazonium salt solution was run into a filtered solution of 5.25 parts of 2,4-pentanedione, 10.0 parts of sodium carbonate and about 9 parts of 50° Bé. aqueous caustic soda in 500 parts of water. The coupling mass was maintained strongly alkaline by the addition of ice. The addition of diazo was made over about 3 hours and thereafter the mass was agitated for about 16 hours.

The product slurry was filtered and the filter cake washed sulfate ion free with water. The cake was washed with 500 parts of 10% aqueous sodium chloride containing 1% sodium hydroxide and then with 1000 parts of 20% aqueous sodium chloride containing 1% sodium hydroxide. The washed cake was then reslurried in 500 parts of water for 2 hours, rendered neutral to nitrazine yellow by the addition of about 4 parts of 20° Bé. hydrochloric acid and the slurry, after being agitated for about 16 hours, was filtered and washed chloride free with water. The washed product was then dried. By the above procedure, 7 parts of the monoazo product 3-(6-ethoxy-2-benzothiazolylazo)-2,4-pentanedione, having the formula:

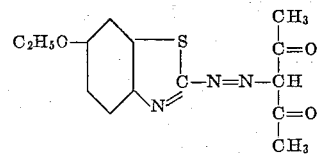

and melting at 120–126° were obtained.

The remaining half of the above-prepared diazonium salt solution was coupled under practically identical conditions with a solution of 11.4 parts of acetoacet-o-anisidide, 10 parts of sodium carbonate, about 9 parts of 50° Bé. aqueous caustic soda in 500 parts of water.

The resulting product (15.9 parts) had the structure

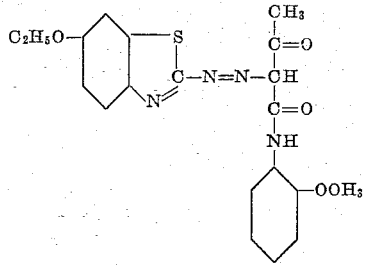

and melted at 178–185°.

Polypropylene containing a stabilizing amount of at least one Werner complex forming metal, e.g. nickel, was dyed with the two dyestuffs prepared above. The dyeings made from the first dyestuff above was colored a bright scarlet having excellent fastness to light, washing, dry cleaning and crocking.

The second dyestuff (i.e., that derived from acetoaceto-anisidide) produced weak orange shades on the same polypropylene fiber when dyed at equal concentration.

Example 2

To a hot solution of 8 parts of 100% sulfuric acid in 20 parts of water, 9.5 parts of 2-amino-6-methoxybenzothiazole were added. This mixture was poured into about 260 parts of 50° Bé. sulfuric acid and the mass was cooled to and maintained at 5° C. or below during the addition thereto of 75 parts of a 1.0 molal solution of nitrosylsulfuric acid in about 30-40 minutes. The mixture was agitated for about 1 hour and thereafter the excess nitrous acid was destroyed with sulfamic acid. The diazonium salt solution was run into a solution of 5.25 parts of 2,4-pentanedione, 10.0 parts of sodium carbonate and about 9 parts of aqueous caustic soda in 500 parts of water. The resulting mass was maintained strongly alkaline by the addition of aqueous caustic soda and below 10° with ice. The diazo addition required about 2 hours and the coupling mixture was agitated for about 16 hours.

The resulting slurry was heated to 50–55°, filtered and the filter cake washed sulfate ion free with water. The cake was washed with 500 parts of 10% aqueous sodium chloride containing 1% sodium hydroxide and then with 1000 parts of 20% aqueous sodium chloride containing 1% sodium hydroxide. The washed cake was reslurried in 500 parts of water for 2 hours, made neutral to Nitrazine Yellow with hydrochloric acid, and the slurry, after being agitated for about 16 hours, was filtered and washed chloride free with water. The washed product was then dried. The product, 3-(-6-methoxy-2-benzothiazolylazo-2,4-pentanedione having the formula:

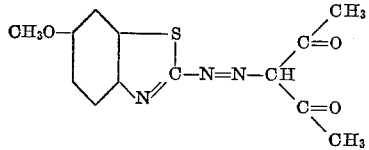

dyed polypropylene stabilized with a nickel compound bright scarlet shades of excellent fastness to light, washing, dry cleaning solvent and crocking.

Example 3

In an analogous manner 2-aminothiazole was diazotized and coupled into 2,4-pentanedione. The resulting monoazo compound was dyed as a disperse dyestuff on polypropylene. The dyeings were weak yellow in shade and of somewhat lesser fastness to light.

Examples 4–8

In a manner described in Example 1 above various 2-aminobenzothiazole compounds were diazotized and coupled into various 1,3-diketone compounds. The resulting monoazo compounds were applied as disperse dyes to stabilized polypropylene fiber containing a nickel compound to produce deep shades of various hues having excellent fastness characteristics.

Specific components of the dyestuffs prepared are listed in Table I above.

It can thus be seen that a novel group of metallizable monoazo dyestuffs suitable for the coloration of poly-α-olefins containing 2 to 3 carbon atoms per unit and containing a Werner complex forming metal in deep shades of excellent fastness has been provided.

As will be evident to those skilled in this art, the invention is not limited to the details of the foregoing purely illustrative examples and that changes can be made without departing from the scope or spirit of my invention.

The dispersion of these novel monoazo dyestuffs and the dyeing of poly-α-olefin materials with these dispersions can be carried out as disclosed in co-pending U.S. application Ser. No. 196,921, filed May 23, 1962.

I claim:

1. The process for dyeing normally solid polymers of α-olefins having 2 to 4 carbon atoms and containing a Werner complex forming metal which comprises contacting said solid polymer with an aqueous dispersion of a monoazo compound

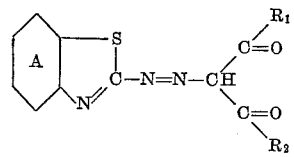

wherein $R_1$ and $R_2$ represent the same or different organic radicals selected from the group consisting of lower alkyl, phenyl, chlorophenyl, tolyl, furyl, and thienyl and wherein the phenylene nucleus A may be further substituted by radicals selected from the group consisting of lower alkyl, lower alkoxy, halogen, nitro, N,N-dimethyl sulfamyl, N-propyl sulfamyl and lower alkyl sulfonyl.

2. The process for dyeing normally solid polymers of α-olefins having 2 to 4 carbon atoms and containing a Werner complex forming metal which comprises contacting said solid polymer with an aqueous dispersion of a monoazo dyestuff comprising 3(6-ethoxy-benzothiazolyl-2-azo)-2,4-pentanedione.

3. The process for dyeing normally solid polymers of α-olefins having 2 to 4 carbon atoms and containing a Werner complex forming metal which comprises contacting said solid polymer with an aqueous dispersion of a monoazo dyestuff comprising 3(methoxy-benzothiazolyl-2-azo)-2,4-pentanedione.

4. A polymer of an α-olefin having 2 to 4 carbon atoms and containing a Werner complex forming metal dyed by the process of claim 1.

5. A polymer of an α-olefin having 2 to 4 carbon atoms and containing a Werner complex forming metal dyed by the process of claim 2.

6. A polymer of an α-olefin having 2 to 4 carbon atoms and containing a Werner complex forming metal dyed by the process of claim 3.

TABLE I

| Ex. | Benzothiazole Compound | 1,3-diketone Compound | Shade on Polypropylene |
|---|---|---|---|
| 4 | 2-aminobenzothiazole | 1-phenyl-1,3-butanedione | Red. |
| 5 | 6-methyl-2-aminobenzothiazole | do | Red. |
| 6 | 4,7-diethoxy-2-aminobenzothiazole | 2,4-pentanedione | Orange-red. |
| 7 | 6-N,N-dimethylsulfamyl-2-aminobenzothiazole | 1,3-bis(p-tolyl)1,3-propanedione | Red. |
| 8 | 6-ethoxy-2-aminobenzothiazole | 1,1,1-trifluoro,4-(2-thienyl)2,4-butanedione | Blue red. |

No references cited.

NORMAN G. TORCHIN, *Primary Examiner.*

D. LEVY, *Assistant Examiner.*